June 6, 1939. C. L. ROSS 2,160,909
RECORDING DEVICE
Filed June 18, 1938 3 Sheets-Sheet 1

INVENTOR.
Cecil L. Ross
BY Howard P. King
ATTORNEY.

INVENTOR.
Cecil L. Ross
BY
Howard P. King
ATTORNEY.

June 6, 1939.  C. L. ROSS  2,160,909
RECORDING DEVICE
Filed June 18, 1938   3 Sheets-Sheet 3
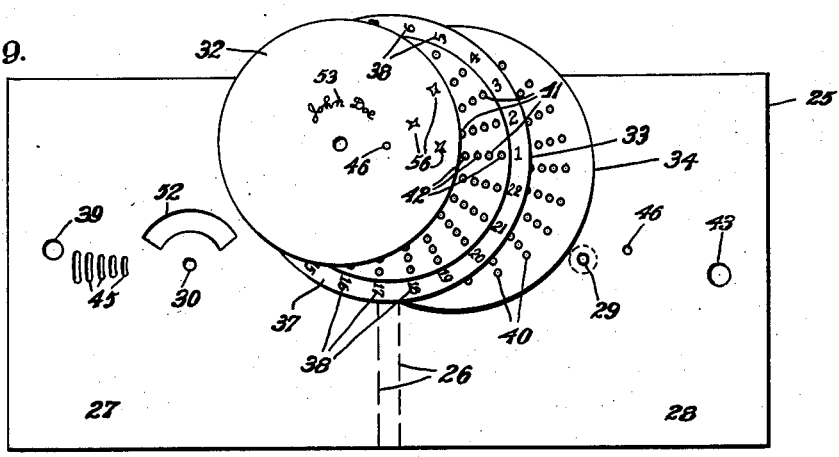
Fig. 9.
Fig. 10.   Fig. 12.   Fig. 11.
Fig. 13.
TEST QUESTIONS
1. COLUMBUS DISCOVERED AMERICA IN:-
   a. 1842
   b. 1805
   c. 1775
   d. 1492
   e. 1560
2. FIRST PRESIDENT OF THE U. S.:-
   a. Benjamin Franklin
   b. George Washington
   c. Thomas Jefferson
   d. Abraham Lincoln
   e. Noah Webster
3. THE STEAMBOAT WAS INVENTED by:-
   a. Edison
   b. Whitney
   c. Studebaker
   d. Morse
   e. Fulton
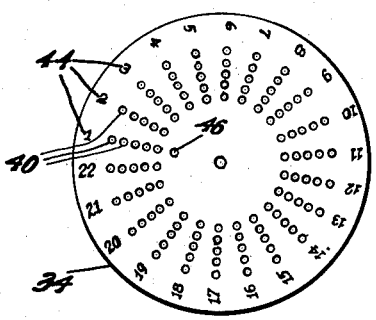
INVENTOR
Cecil L. Ross
BY Howard P. King
ATTORNEY.

Patented June 6, 1939

2,160,909

UNITED STATES PATENT OFFICE 2,160,909

RECORDING DEVICE

Cecil L. Ross, Upper Montclair, N. J.

Application June 18, 1938, Serial No. 214,519

11 Claims. (Cl. 35—48)

This invention relates to recording devices, and more particularly to a device for the use of students in answering examination questions by selection of the proper answer from a given list of answers.

The objects of the invention are to provide a recording device of the character indicated adaptable to individual use by each student of a class; to enable the teacher to be able to promptly rate the results of the examination of the several students; to provide a permanent identified record of each student's work; to enable the device to be repeatedly used; to provide parts which are readily assembled by the teacher; to provide means for registering the several disks ready for the students' use; to provide a structure which prevents the student from foretelling the proper answer from any structural characteristic of the recording device; to secure simplicity of construction, assembly and use; and to obtain other advantages and results as may be brought out in the following description.

Referring to the accompanying drawings in which like numerals of reference indicate similar parts throughout the several views:

Figures 6, 7, 8 and 9 are views of the folder spread open and showing the several disks arranged in place on the stud in Fig. 6 and successively removed from the stud in Figs. 7 to 9;

Figure 10 is a view of the top disk or recording sheet viewing the underside of the same;

Figure 11 is a view of the bottom disk viewing the underside of the same;

Figure 12 is a sectional view on line 12—12 of Figure 1; and

Figure 13 is an illustrative test sheet, the correct answers of the three questions there propounded having been punched in the record sheets of Figures 9 and 10.

Figure 1:
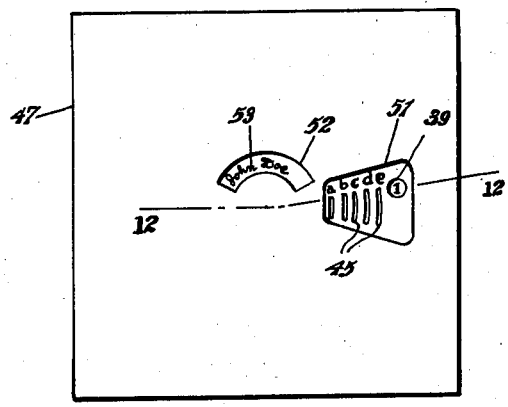
Figures 1 and 2 are front and back views respectively of my improved recording device ready for use by the student and showing the student's name as having been written thereon.
Figure 2:
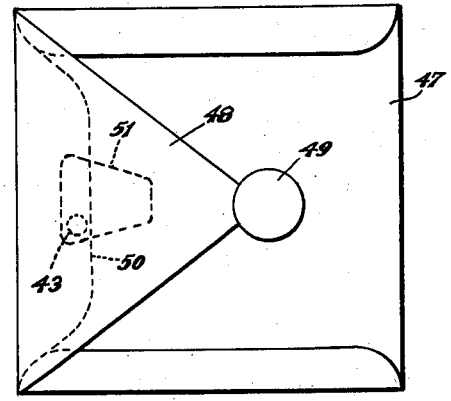
Figure 3:
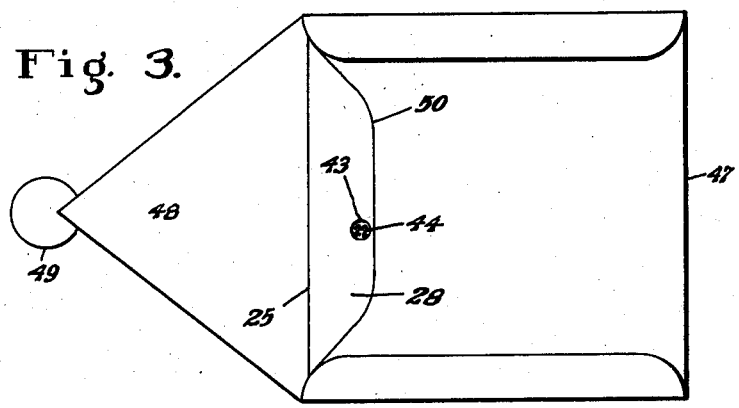
Figure 3 is another rear view showing the seal detached from the back and the envelope flap opened.
Figure 4:
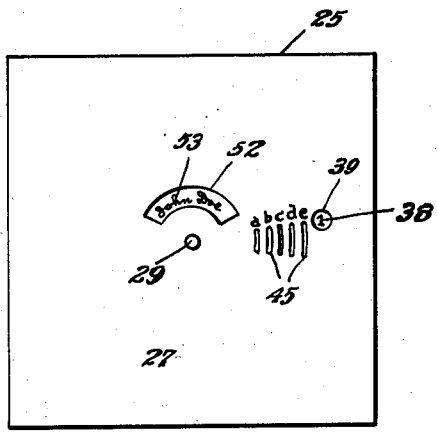
Figures 4 and 5 are front and back views respectively of the folder portion of the device and contents removed from the envelope.
Figure 5:
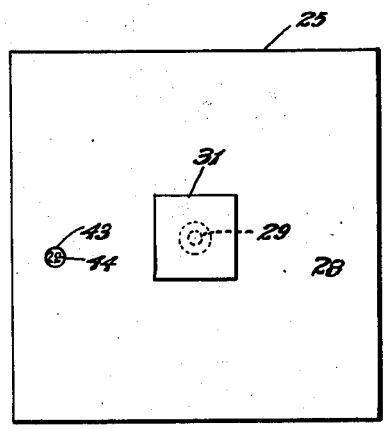
Figure 6:
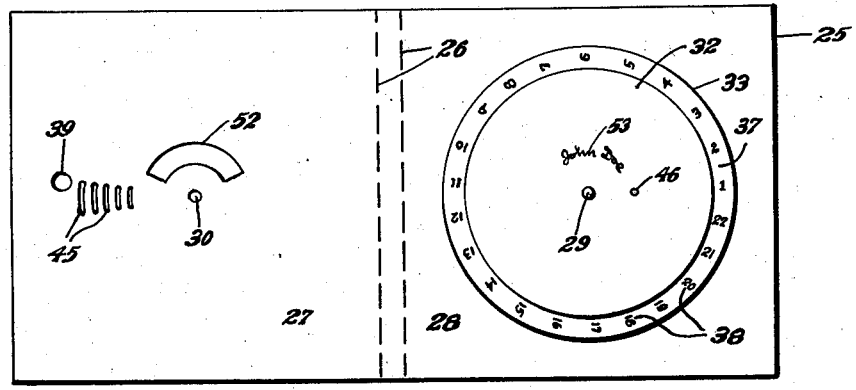
Figure 7:
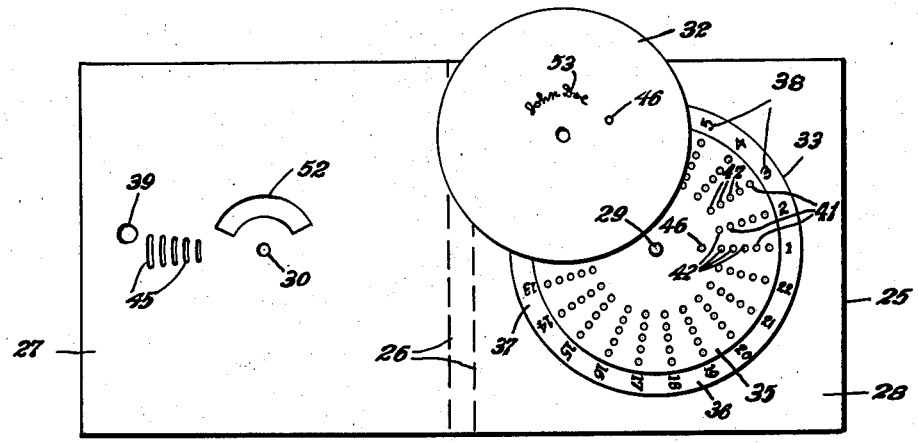
Figure 8:
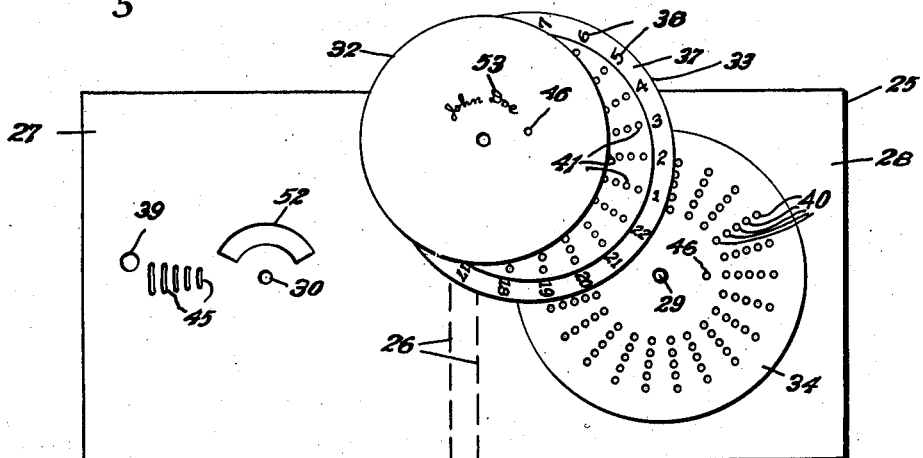

In the specific embodiment of the invention illustrated in said drawings, and with reference to the same initially in its broadest aspect I provide a folder having therein a plurality of juxtaposed disks, the top one of which is preferably a record sheet. The folder provides exposed slits through which a stylus or other thin instrument may be inserted for puncturing the work sheet and rotating one or more of the disks a distance corresponding to the length of the slit. This operation therefore accomplishes two things, namely, it makes a record on a work sheet as to where the puncture is made and secondly it advances at least the next disk to the work sheet as well as the work sheet ready for the next puncture and advancement. The disks likewise provide successive numbers, a new one of which appears at the same side of the device as said slits with each advancement effected by moving the stylus in the slit the length of the slit. A question sheet is provided wherein the questions have numbers identifying the same to correspond with the successive numbers thus appearing at the front of the recording device. On the question sheet there are a plurality of answers under each question, there preferably being as many answers as there are slits in the recording device and correspondingly designated with the slits, for instance by letters a, b, c and so forth. Only one of the answers under each question is correct, and if the student inserts the stylus in the proper slit of the correct answer, the work sheet or top disk will ultimately show the puncture as giving the correct answer. Likewise, when the correct answer is thus indicated by puncturing at the upper end of the right slit, the stylus is permitted to pass through the next adjacent disk into a bottom disk which is therefore likewise rotated with the other two disks, but if the wrong answer is indicated by puncture, the intermediate disk prevents passage of the stylus through it and the bottom disk will not be rotated. On the underside of the bottom disk are a plurality of successive numbers so arranged that the numbers progressively show through an opening in the bottom of the folder each time that disk is rotated. The bottom disk accordingly shows the number of correct answers at any time while the number showing through the top of the folder indicates the number of the question awaiting answer. The folder and the several disks included therein are received by the student in an envelope which is sealed and through which there is an opening giving the student access to the several slots and view of the question number to be answered. The student is not permitted to see the numbers on the back of the bottom disk (which indicate the number of correct answers) because these numbers are covered by the back or flap of the envelope which is sealed closed.

When the examination is completed, the student turns in the envelope and contents, and the teacher breaks the seal of the envelope and observes the rating for the student merely by opening the flap of the envelope. The work sheet can be removed, a new one inserted, the several disks reset and the envelope sealed ready for its next use.

While the foregoing dissertation is quite general as to the structure and use, it is to be understood that even many of the generalities therein expressed may be changed, omitted or added to, it being desired by the description so far given to merely give a general outline of the specific showing which will now be described with greater particularity.

As shown, I preferably provide a heavy cardboard folder 25 which folds substantially midway of its length on parallel fold lines 26 so as to allow for thickness of material between the parts of the folder which for convenience will be designated as the front 27 and back 28 thereof. The folder may be made so that its front and back are each substantially square and will assume a substantially parallel relationship to each other when the one is folded over in closed position of the folder. At a central part of the back 28 is mounted a stud 29 which stands upright from the said back at the underside of the same so as to be received in a socket 30 of the front 27 when said front is folded over in its closed position. For convenience, means for mounting the stud may be employed, the particular construction shown utilizing a stud having a flange at its bottom which will underlie flatwise against the rear face of the back 28 with the shank of the stud extending through said back. A patch 31 underlies the head of the stud which is cemented or otherwise secured to the underface of back 28 so as to hold the stud permanently in position.

A plurality of disks are removably mounted on said stud. As here shown, the disks employed comprise an upper work sheet 32, an intermediate disk or selector 33 juxtaposed immediately beneath the work sheet and a lower or counting disk 34 immediately below the selector and resting against the back 28. As a convenient expedient for manufacturing purposes, the intermediate disk may be fabricated from two pieces of cardboard or other suitable material which will be secured together during manufacture in juxtaposed concentric position. As a matter of convenience the upper one of these pieces of material will be designated the upper ply 35 of the selector and the other layer of the disk will be desigated the lower ply 36 of the selector. I have shown the upper ply 35 of a less diameter than the lower ply 36 so that the lower ply provides a rim 37 projecting beyond the upper ply. This rim may conveniently present on its upper surface in successive order around the same, numerals, here shown as 1 to 22, and identified by reference numeral 38 for indicating the question numbers. Inasmuch as the work sheet or disk 33 will rotate simultaneously with each rotative impetus applied by the student, the question numbers 38 may just as well be upon the upper surface of the work sheet as upon the rim of the selector. A hole 39 is provided in the top 27 in appropriate relation to the question numbers on the disk selected to bear them, and in the specific illustration, said hole 39 is juxtaposed with respect to margin or rim 37 of the selector. Under the specific conditions described, the work sheet preferably has a diameter substantially equal to the upper ply 35 of the selector so as not to project over the margin and therefore so as not to hide the question numbers appearing on the said margin.

The selector 33 and counting disk 34 have series of socket holes therein, each series being upon a radius of the disk and there being as many series on evenly spaced radii at equal distances from the center of both disks as there are question numbers appearing around the disk. At a matter of convenience, the several question numbers are each positioned on the same radius as each series of sockets in the selector. As here shown, the counting disk 34 has five sockets 40 in each radial series, said sockets being shown extending entirely through the thickness of the disk, although such is not necessary so long as the sockets are upwardly open and provide sufficient side wall for engagement by the stylus when inserted therein. The spacing of these sockets of each series and spacing apart of the series is identical with a corresponding spacing of the sockets in the selector. The sockets in the selector are of two kinds, namely, one socket as 41 of each radial series extends through both plies of the selector, whereas the other four sockets 42 of the selector extend through only the upper ply 35 of the selector. The socket 41 which extends entirely through the selector represents the proper hole for inserting the stylus when answering that particular question correctly. The student has no way of telling which hole or socket goes all the way through, and if he answers the question incorrectly by inserting the stylus in one of the sockets 42 having a bottom closed by underply 36 of the selector, his stylus cannot reach the sockets 40 of the counting disk and therefore when he makes his rotative motion the counting disk remains unmoved and only the selector and work sheet are rotated. Beneath the counting disk 34 is an opening 43 suitably positioned with respect to numbers identified by reference numeral 44 on the underside of the counting disk. The numbers 44 of this opening 43 are so related that when a question is answered correctly the rotation of the counting disk is just far enough to expose the next successive number of the disk, and since the disk is moved only the number of times questions have been answered correctly, the final number appearing through opening 43 will represent the total number of correct answers which have been made by the student. It will accordingly be observed that the number 44 appearing through opening 43 may be less than, equal to, but never numerically greater than the number 38 appearing through hole 39 in the top of the folder.

It is now to be noted that the work sheet or disk 32 uppermost in the bank of disks has no perforations therein registering with any of the perforations of the series of perforations in the selector immediately thereunderneath. The top 38 of the folder 25 is provided with a series of slits 45 concentrically arranged with respect to the center stud receiving hole 30 and spaced so as to each overlie one of the sockets of the selector. By positioning the selector and counting disk so that a series of the sockets thereof underlie the upper ends of the several slits, and by having slits equal in length to the inclusive distances of the sockets between two adjacent series, the student may insert his stylus next the upper end of any selected slit, puncture the work sheet and pass the stylus into the socket of the selector. If the answer is the correct one his stylus goes through to the counting disk and then he moves the stylus downwardly in the direction of the slit, thereby rotating all disks one step forward. If his stylus is inserted in a slit representing the wrong answer, it punctures the work sheet, but enters into the socket 42 in the upper ply of the selector and goes no further. Then a rotative motion turns the work sheet and selector only. A new question number appears and the student endeavors to answer that question.

In order that the several disks may be conveniently quickly positioned, I have shown each disk provided with a positioning hole 46, said hole being equidistant from the center of each disk so that a stylus or other instrument may pass through said registering holes of the several disks. Likewise, the bottom 28 of the folder may have a similarly positioned registering hole 46 whereby the stylus will come to resting position and thus have all of the disks in proper relation with respect to each other and with respect to the folder so that the proper question numbers appear through the lower opening 43 for that purpose and likewise, when the folder is closed the right number appears through opening 39 in the top of the folder for starting purposes. In the specific illustration, the device is designed for twenty-two questions. The under disk will therefore show the numeral twenty-two when the disk is in its starting position and the numeral one will appear through the upper opening. Assuming the first question is answered correctly this upper numeral changes to two and the numeral through the lower opening 43 then registers one. Thus the device indicates one question has been answered correctly and that question number two awaits answer.

It is not desired that the student shall know whether he has answered the question correctly or not as the examination proceeds. Likewise it is not desirable that he shall be able to investigate which hole of any series passes entirely through the selector. Accordingly, the work parts are preferably sealed from any such student investigation by placing the folder in an envelope 47, the flap 48 of which is suitably secured as by a seal 49. The envelope is constructed in suitable manner to render under-opening 43 visible to the instructor when the seal is broken and the flap turned up so as not to necessitate withdrawing the folder from the envelope at the time the student is given his rating. As here shown, the back of the envelope beneath the flap is cut back, as at 50 not only enabling the rating to be observed when the flap is opened, but rendering the envelope more satisfactory in introducing or removing the folder with respect thereto. The front of the envelope has a suitable opening 51 therein at the part thereof where the slits are positioned when the envelope is in use, thus giving access by the student to manipulate the stylus in said slits. The cut out 51 is preferably made large enough to also expose the upper opening 39 of the folder to enable the student to see the question number. If so desired, another cut out 52 may be made in the top face of the envelope through which the student can write his name on the underlying work sheet 32, as shown done at 53. Secondly, the work sheet will become a permanent record, bearing the student's name thereon. It is a function of this work sheet to show how the questions have been answered, either correctly or incorrectly. As one means of accomplishing this purpose, I have shown the underside of the work sheet provided with radial lines 54 corresponding to a radial series of holes in the selector disk, and conveniently designated with indication of the question numbers at the end of each radial line 54. Likewise, the said underside of the work sheet has arcuate lines 55 thereon corresponding to the spacing of the sockets of each series of the selector. Therefore, each time the stylus is used to puncture through the work sheet into the selector, the puncture 56 in the work sheet will be substantially at an intersection of one of the radial lines corresponding to the answer under the question.

In accordance with the present showing, a question sheet 57 is provided showing three questions, and under each question are five answers designated by letters a to e inclusive. Accordingly, the arcuate lines on the back of the work sheet have corresponding designations of a to e. The student is directed to the proper slit in the top 27 of the folder by corresponding designations a to e appearing over the several slits. According to the particular question and answers appearing in the question sheet, the proper answer for question one is a puncture of d, which is shown correct in Figs. 9 and 10, and the proper answer for question two is to puncture b, which likewise is shown done in Figs. 9 and 10 and the proper answer for question 3 is to puncture e, which again is shown in Figs. 9 and 10. It follows, therefore, that the instructor or student can ultimately examine the work sheet in connection with the question sheet and determine which answers were correct and which answers were incorrect, the record being permanent and properly identified because the name of the student is on the front side thereof.

Obviously the invention is capable of extension to more given answers than merely five and to the asking of more than twenty-two questions, by appropriate reproportioning and provision of more or less holes and greater or less rotation with corresponding lengthening and shortening of the slits for the purpose. The use is likewise not confined to the specific type of examination shown nor necessarily to examinations, and I accordingly wish it to be understood that various modifications both of structure and use may be made without departing from the spirit or scope of the invention except as necessarily confined within the terms and scope of the following claims to which the broadest possible interpretation is intended so far as permitted by the prior art.

I claim:

1. A device as characterized comprising a plurality of disks of which one disk provides a plurality of sockets therein arranged in series and of which one socket of each series extends through the disk and the other sockets of each series have bottoms formed in the disk whereby a tool for rotating the disks introduced in any of the said sockets passes through the disk having said sockets only upon selection of the socket which extends through said disk, and means covering said sockets in use to prevent visual determination of which socket extends through said disk, said covering means being puncturable.

2. A device as characterized comprising a plurality of disks of which one disk provides a plurality of sockets therein arranged in series and of which one socket of each series extends through the disk and the other sockets of each series have bottoms formed in the disk whereby a tool for rotating the disks introduced in any of the said sockets passes through the disk having said sockets only upon selection of the socket which extends through said disk, means covering said sockets in use to prevent visual determination of which socket extends through said disk, said covering means being puncturable, and means for indicating the location of the hidden sockets enabling the user to insert the tool to puncture said covering means and insert the tool into a selected socket.

3. A device as characterized comprising a plurality of disks of which one disk provides a plurality of sockets therein arranged in series and of which one socket of each series extends through the disk and the other sockets of each series have bottoms formed in the disk whereby a tool for rotating the disks introduced in any of the said sockets passes through the disk having said sockets only upon selection of the socket which extends through said disk, means covering said sockets in use to prevent visual determination of which socket extends through said disk, said covering means being puncturable, and an upper cover having a plurality of slits therein the upper ends of which register above the several sockets of the said series for enabling the user to puncture the said covering means next to the end of a selected slit and introduce the tool into the selected socket and then rotate the disks engaged by moving the tool laterally toward and to the other end of the slit.

4. A device as characterized comprising a cover member having a slit therein, in combination with a selector disc beneath said cover and rotatable by engagement of an instrument inserted in and limited by said slit in its impelling contact with said disc to impel the disc with a step by step forward motion and said disc rotated a step with each attempt at performance of a designated solution, and a second disc correspondingly rotatable by engagement of said instrument inserted in and limited by said slit in its impelling contact with said second disc to impel the disc with a step by step forward motion and said second disc receiving said instrument and impelled thereby only with each successful performance of the desired solution.

5. A device as characterized comprising a cover member having a slit therein, in combination with a selector disc beneath said cover and rotatable by engagement of an instrument inserted in and limited by said slit in its impelling contact with said disc to impel the disc with a step by step forward motion and said disc rotated a step with each attempt at performance of a designated solution, and a second disc correspondingly rotatable by engagement of said instrument inserted in and limited by said slit in its impelling contact with said second disc to impel the disc with a step by step forward motion and said second disc receiving said instrument and impelled thereby only with each successful performance of the desired solution, and means functioning consequent upon the insertion of and impelling rotation by said instrument for making a record of attempts at performance.

6. A device as characterized comprising a cover member having a slit therein, in combination with a selector disc beneath said cover and rotatable by engagement of an instrument inserted in and limited by said slit in its impelling contact with said disc to impel the disc with a step by step forward motion and said disc rotated a step with each attempt at performance of a designated solution, and a second disc correspondingly rotatable by engagement of said instrument inserted in and limited by said slit in its impelling contact with said second disc to impel the disc with a step by step forward motion and said second disc receiving said instrument and impelled thereby only with each successful performance of the desired solution, and means functioning consequent upon the insertion of and impelling rotation by said instrument for making a record of both the successful and unsuccessful attempts at performance.

7. A device as characterized comprising a cover member having a slit therein, in combination with a selector disc beneath said cover and rotatable by engagement of an instrument inserted in and limited by said slit in its impelling contact with said disc to impel the disc with a step by step forward motion and said disc rotated a step with each attempt at performance of a designated solution, and a second disc correspondingly rotatable by engagement of said instrument inserted in and limited by said slit in its impelling contact with said second disc to impel the disc with a step by step forward motion and said second disc receiving said instrument and impelled thereby only with each successful performance of the desired solution, and a third disc comprising a puncturable work sheet likewise rotatable with a step by step forward motion by said instrument punctured therethrough for making a record of attempts at performance.

8. A device as characterized comprising a cover member having a slit therein, in combination with a selector disc beneath said cover and rotatable by engagement of an instrument inserted in and limited by said slit in its impelling contact with said disc to impel the disc with a step by step forward motion and said disc rotated a step with each attempt at performance of a designated solution, and a second disc correspondingly rotatable by engagement of said instrument inserted in and limited by said slit in its impelling contact with said second disc to impel the disc with a step by step forward motion and said second disc receiving said instrument and impelled thereby only with each successful performance of the desired solution, and a third disc comprising a puncturable work sheet, likewise rotatable with a step by step forward motion by said instrument punctured therethrough for making a record of both the successful and unsuccessful attempts at performance.

9. A device as characterized comprising a covering member having a slit therein, in combination with a plurality of discs concentrically rotatable therein and impelled by insertion and movement of an instrument in said slit, one of said discs having numbers appearing consecutively with each forward motion of the disc by impelling movement of the instrument the full length of said slit, and another of said discs having numbers appearing concentrically at the back of the folder with each advancement of the disc when impelled by said instrument, the first mentioned of said discs having means for selectively passing the instrument therethrough or stopping the instrument from passing therethrough and the said disc next the back of the folder being selectively advanced dependent upon the instrument passing through the first said disc to reach and advance the said second disc whereas said first disc is advanced with each impelling movement of the instrument moving the length of the slit.

10. A device as characterized comprising a plurality of discs superposed one on the other, in combination with a covering member having a slit for reception of an instrument therein, said instrument being insertable in two of said discs for moving said discs together a distance governed by the length of the slit, one of said two discs having means for stopping passage of the instrument therethrough on some occasions and permitting passage on other occasions, and another disc selectively movable with the first two said discs on occasions when the said instrument passes entirely through the two first said discs.

11. A device as characterized comprising a plurality of discs superposed one on the other, in combination with a covering member having a slit for reception of an instrument therein, said instrument being insertable in two of said discs for moving said discs together a distance governed by the length of the slit, one of said two discs having means for stopping passage of the instrument therethrough on some occasions and permitting passage on other occasions, and another disc selectively movable with the first two said discs on occasions when the said instrument passes entirely through the two first said discs, said cover member being removable for setting purposes to expose the upper of said discs, and all of said discs having each a single hole all registrable one with another but not registrable with any other hole of any of the discs whereby an instrument inserted in the hole of the upper disc and the disc rotated will ultimately enable the instrument to enter the hole of the second disc and so on for all the discs for registering the same at starting position.

CECIL L. ROSS.